W. T. DOREMUS.
Chair.
No. 159,806.  Patented Feb. 16, 1875.
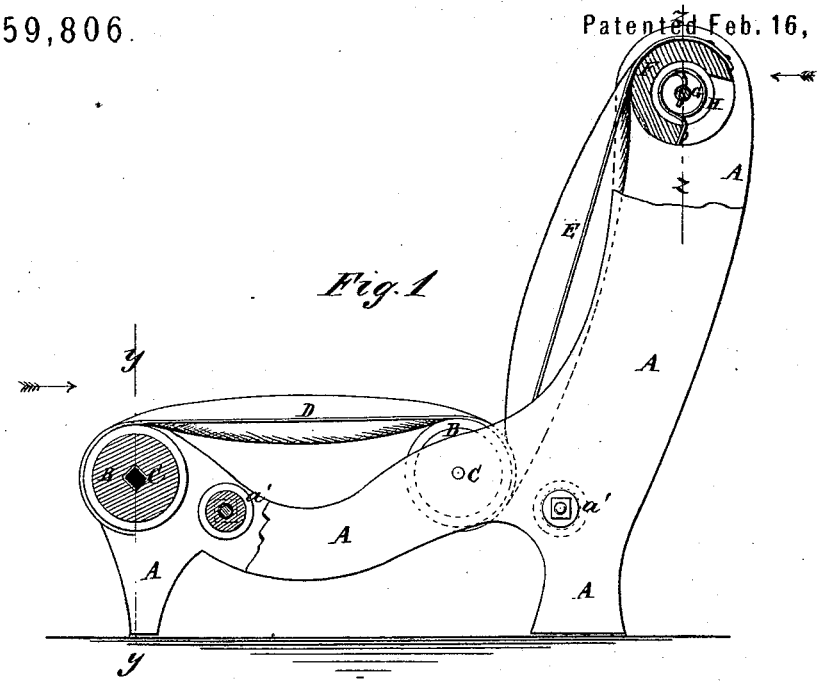
Fig. 1
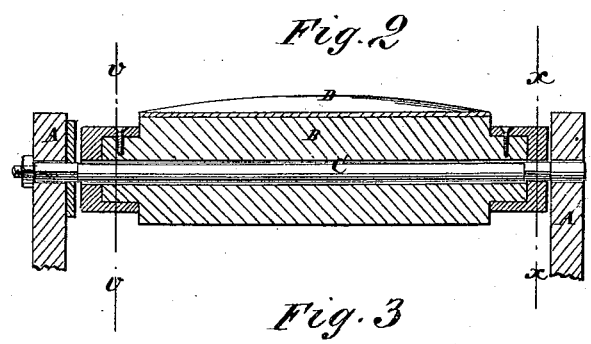
Fig. 2
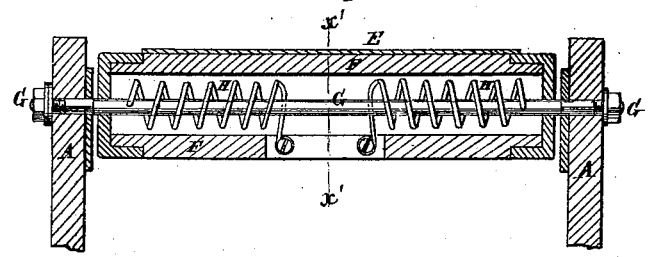
Fig. 3
Fig. 4
WITNESSES:
A. W. Almqvist
A. F. Terry
INVENTOR:
Wm T. Doremus
BY
ATTORNEYS.

UNITED STATES PATENT OFFICE.

WILLIAM T. DOREMUS, OF NEW YORK, N. Y.

IMPROVEMENT IN CHAIRS.

Specification forming part of Letters Patent No. 159,806, dated February 16, 1875; application filed November 21, 1874.

*To all whom it may concern:*

Be it known that I, WILLIAM T. DOREMUS, of the city, county, and State of New York, have invented a new and useful Improvement in Springs for Chairs, &c., of which the following is a specification:

Figure 1 is a side view of a chair-frame to which my improvement has been applied, partly in section, through the lines $x\ x$ and $x'\ x'$, Figs. 2 and 3, to show the construction. Fig. 2 is a detail section taken through the line $y\ y$, Fig. 1. Fig. 3 is a detail section through the line $z\ z$, Fig. 1. Fig. 4 is a detail section through the line $v\ v$, Fig. 2.

Similar letters of reference indicate corresponding parts.

My invention has for its object to furnish an improved spring for chairs, lounges, bed-bottoms, and other articles, which shall be simple in construction, conveniently applied, and effective and durable in use.

The invention consists in the combination of one or more torsion-rods, secured at one end and free at the other, and one or more rollers, secured at one end to the torsion-rods and free at the other, with a frame-work, and with the upholstering or cover; and in the combination of the rod secured at both ends, the perforated or hollow roller, and one or more coiled springs with the frame and the upholstering, as hereinafter fully described.

A represents a chair-frame, the side parts of which are connected and held in their proper relative positions by cross-bars $a'$. B are rollers, which are perforated longitudinally to receive the rod C. The rod C may be round, square, triangular, or of any other desired form. The rod C is rigidly secured at one end to the frame A, and its other end works loosely in bearings in the other part of said frame. The end of the roller B next the free end of the rod C is rigidly attached to the said rod.

The rod C may be connected with the frame A and roller B by means of washers, sockets, or ferrules having square holes formed through them, and squaring off the parts of the rod C that pass through the said washers, sockets, or ferrules, as shown in Figs. 1 and 2.

D is the cover or upholstering of the chair-seat, lounge, or bed-bottom, which is attached to the outer sides of the rollers B, as shown in Fig. 1, so that, when weight is applied to said seat or cover, the rollers B may be turned toward each other, putting the rods C under a torsion strain, and thus giving the desired elasticity.

In the case of large chairs, lounges, and bed-bottoms, four rollers and rods, B C, may be used, placed at right angles with each other. The rollers B may be made cylindrical, as shown in the drawings.

E is the upholstering for the back of the chair, the lower end of which is attached to the rear roller B, or to some other suitable support, and its upper end is attached to the roller F. The roller F has a large perforation formed longitudinally through it, through the center of which is passed a rod, G, which passes through holes in caps attached to the ends of the roller F, and its ends are rigidly secured to the frame A. H are two coiled springs, the inner ends of which are secured to the middle part of the roller F, and their outer ends are secured to the rod G, as shown in Figs. 1 and 3.

If desired, a single spring, H, may be used, secured at its middle part to the roller F, and at its ends to the rod G.

With this construction, when the cover E is put under pressure the roller F will be turned in such a direction as to tend to coil up the spring or springs H, so as to give elasticity to the back of the chair.

The ends of the rod G may be secured to the frame A by washers or sockets.

Having thus described my invention, I claim as new and desire to secure by Letters Patent—

1. The combination of one or more torsion-rods, C, secured at one end and free at the other, and one or more rollers, B, secured at one end to the torsion-rods and free at the other, with a frame, A, and the upholstering or cover D, substantially as herein shown and described.

2. The combination of the rod G, secured at both ends, the perforated or hollow roller F, and one or more coiled springs, H, with the frame A and the upholstering E, substantially as herein shown and described.

WILLIAM T. DOREMUS.

Witnesses:
JAMES T. GRAHAM,
T. B. MOSHER.